United States Patent
Burton

(10) Patent No.: US 6,877,267 B2
(45) Date of Patent: Apr. 12, 2005

(54) TURKEY DECOY TILTABLE COUNTER-BALANCED SUPPORT BASE

(76) Inventor: Richard L. Burton, 1849 Melrose Rd., Sonora, KY (US) 42776

( * ) Notice: Subject to any disclaimer, the term of this patent is extended or adjusted under 35 U.S.C. 154(b) by 44 days.

(21) Appl. No.: 09/775,007

(22) Filed: Feb. 1, 2001

(65) Prior Publication Data

US 2002/0100205 A1 Aug. 1, 2002

(51) Int. Cl.⁷ .............................................. A01M 31/06
(52) U.S. Cl. ............................................................ 43/2
(58) Field of Search .......................... 43/2, 3; 248/143, 248/910

(56) References Cited

U.S. PATENT DOCUMENTS

| | | | |
|---|---|---|---|
| 524,894 A | * 8/1894 | Forsberg | 248/910 |
| 1,228,615 A | * 6/1917 | Stafford | 248/143 |
| 1,653,897 A | * 12/1927 | Farr | 248/910 |
| 1,804,306 A | 5/1931 | Bender | |
| 2,142,647 A | * 1/1939 | Heller | 248/910 |
| 2,576,209 A | 11/1951 | Berger | |
| 2,746,195 A | 5/1956 | Renwick, Jr. | |
| 2,849,823 A | 9/1958 | Miller | |
| 3,312,437 A | * 4/1967 | Barth | 248/910 |
| 3,415,475 A | * 12/1968 | Goodman | 248/143 |
| 3,834,054 A | 9/1974 | Gentry et al. | |
| 4,120,110 A | 10/1978 | Aeschliman | |
| 4,148,455 A | * 4/1979 | Oliver | 248/524 |
| 5,168,649 A | 12/1992 | Wright | |
| 5,199,204 A | 4/1993 | Lowery | |
| 5,205,060 A | 4/1993 | Franceschini | |
| 5,354,031 A | * 10/1994 | Bilotti | 248/519 |

* cited by examiner

Primary Examiner—Kurt Rowan
(74) Attorney, Agent, or Firm—Carrithers Law Office PLLC; David W. Carrithers

(57) ABSTRACT

A turkey decoy base is provided having a generally semi-circular base defining a disc with a generally curved bottom portion having a flattened central section for enabling a turkey decoy mounted upon a rod extending from the top of the base to wobble, pivot, and swivel when pulled with a string or upon wind blowing the decoy. The base is formed having a counter-balance to hold the turkey decoy upright.

15 Claims, 2 Drawing Sheets

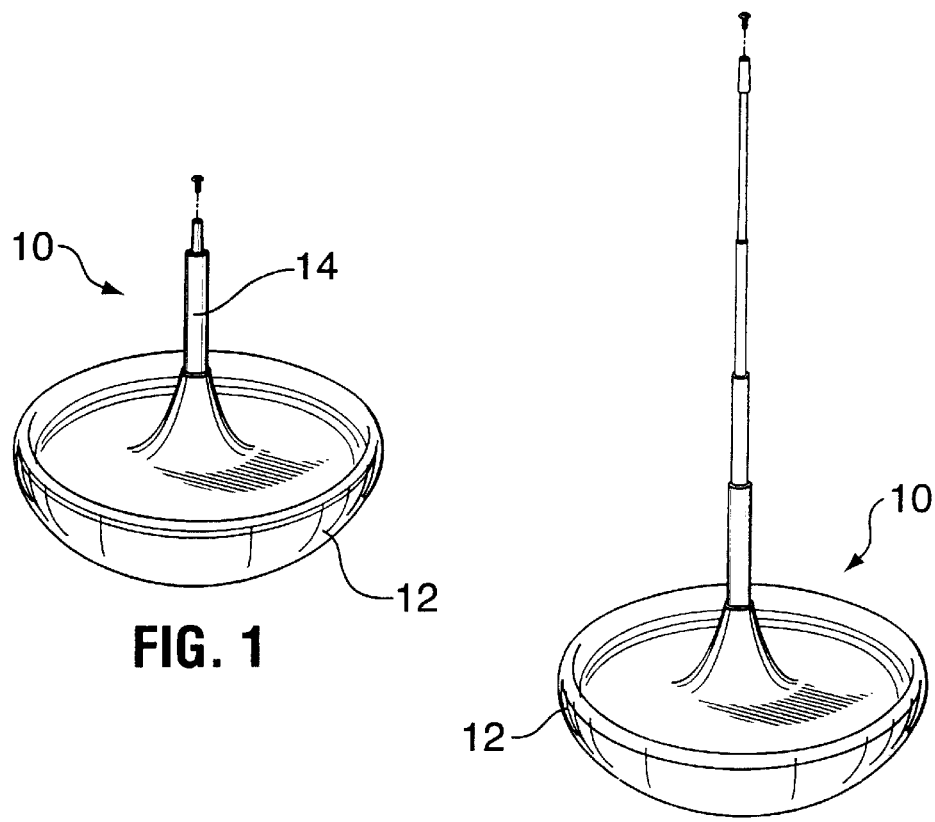
FIG. 1
FIG. 2
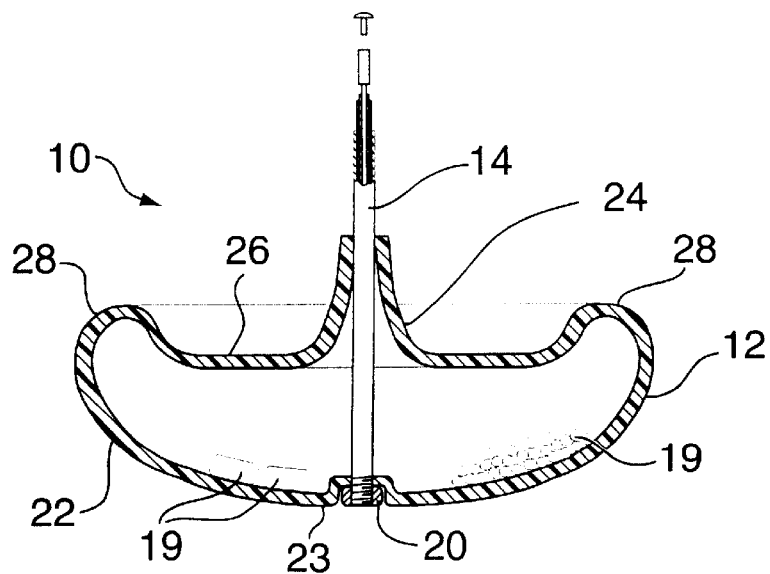
FIG. 4

TURKEY DECOY TILTABLE COUNTER-BALANCED SUPPORT BASE

BACKGROUND OF THE INVENTION

1. Technical Field

The present invention relates to a movable base having a rod extending therefrom for mounting a decoy such as a turkey wherein wind or pulling the decoy with a string causes the decoy to pivot and wobble upon its axis. The present invention includes a counter-balanced base retains the decoy in an upright position.

2. Description of the Prior Art

Typically, a turkey will tend to hesitate in movement among bushes and undergrowth at the edge of a clearing making a clear shot difficult. The use of a female turkey or hen, can sometimes lure a male turkey or tom into the clearing for a better shot. A change of position is desirable to provide a life-life decoy. A turkey sized and shaped decoy molded of synthetic material is widely available and comes in a life size synthetic shell of material which may be supported by a single rod of pole extending upward through the bottom of the decoy and cooperatively engaging an aperture formed in the top of the turkey back, thus allowing the turkey to rotate 360 degrees.

Conventional decoy typically must be mounted on stake at each hunt site. This involves putting two sections of a stake together, then putting the stake through the body of the decoy shell and extending the distal end of the stake through a small hole in the bottom of the decoy, then extending the opposing distal end of the stake through a smaller hole on top of the decoy. This procedure is tedious. Moreover, the stake must be pushed into the hard ground which is difficult in hunting areas which are not tilled and may be hard due to climatic conditions in the fall. Furthermore, since the stakes must be pushed into the ground, the hunter must walk through the location where he/she wants to position the decoy. Many times the hunter can't get decoys set up without being seen by a gobbler. Turkey decoy stakes currently available are of a rigid nature. This limits the movement and realism of the turkey decoy. Sometimes a real turkey will watch the decoy and run off because the decoy does not move, thus it does not appear to be a real turkey. The only motion the decoy will make is in the circular motion caused by the wind.

None of the conventional mounting devices incorporates a counter-balance in the design of the base providing a means for the decoy turkey to wobble and attract the attention of the male turkey.

SUMMARY OF THE INVENTION

The decoy base of the present invention is a self-righting stake on a weighted base which includes three main elements: a semi-circular saucer shaped base, a stake attached to and extending vertically upward from the top of the base, and a weight affixed to the bottom-central section of the base.

More particularly, the present invention provides a decoy base for use with a molded decoy such as a turkey. An embodiment of the decoy includes a circular shaped disc, saucer, or bowl having a generally curved bottom surface with a small flat central portion, a top surface defining a conical center having a central hole therethrough, a rod extending vertically through said central hole in cooperatively engaging a means for holding disposed within said circular shaped disc, and means for weighing disposed therein positioned a selected locations around said rod and/or the inner surface of the base for counterbalancing the base and decoy mounted thereon permitting swaying motion in windy environments or upon pulling on the decoy and/or base with a string.

The present invention will lean and/or wobble with respect to the ebb and flow of the wind.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 1 is a perspective view showing the present invention;

FIG. 2 is a perspective view showing the present invention wherein a turkey decoy is position on and supported by the support rod of the present invention;

FIG. 4 is a partial cut-away view of FIG. 1, showing the threaded socket and weights within the base.

DESCRIPTION OF THE PREFERRED EMBODIMENT

Figure 3:
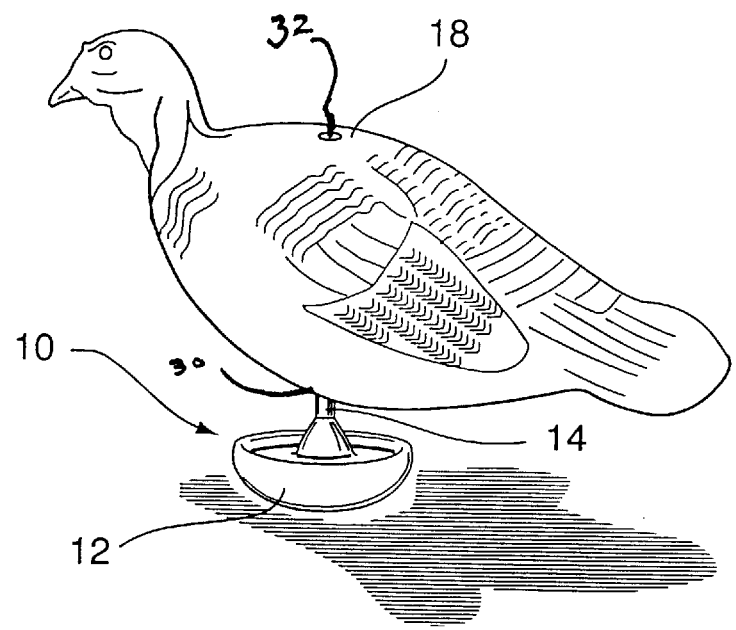
FIG. 3 is a perspective view showing the present invention wherein the stake is sized in relationship to the decoy shown in FIG. 2, wherein the stake extends through a bottom hole 30 and top hole 32 of the molded turkey decoy supported thereby.
Figure 5:
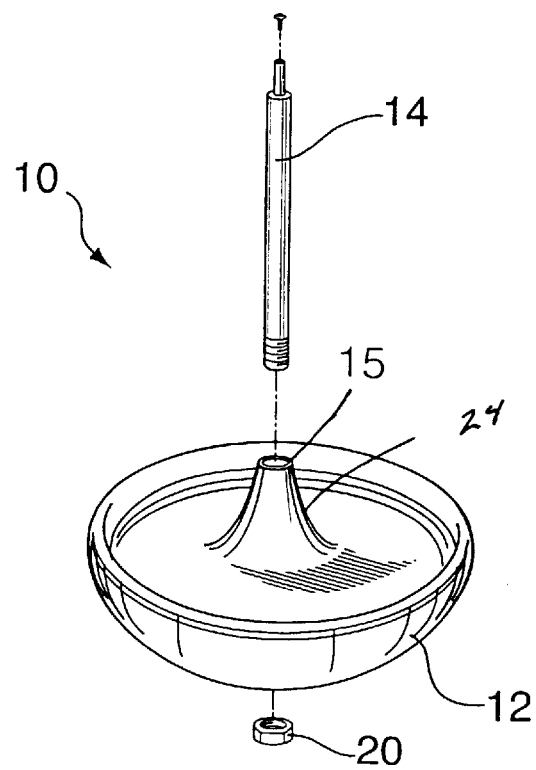
FIG. 5 is a perspective view of the present invention showing the opening in the central cone.

As shown in the drawings 1–4, the turkey decoy tiltable counter-balanced support base of the present invention is a self-righting stake on a weighted base. The decoy base 10 includes a semi-circular saucer shaped base 12, a stake 14 attached to and extending vertically upward from the top of the base, and a weight(s) 16 affixed to the bottom central section of the base 12 by a means for holding such as a threaded socket 20. A molded turkey decoy 18 is mounted onto the stake 14 as shown in FIG. 2.

The preferred embodiment of the base 12 of the decoy base 10 is made of plastic or some other synthetic material convenient for molding. Fiberglass, nylon, polyethylene, PVC, ABS, polypropylene are typical plastics which may be molded to the desired shape. Other materials such as wood, metal including aluminum, steel, or combinations of metal and plastic may be used to produce the base 12.

The preferred embodiment is a semicircular saucer or disc shaped base having an upper section resembling a torus. The base 12 defines a generally curved bottom surface 22 having a small flat central area 23, and a top surface 13 connecting to the curved bottom surface 22 forming a curved sidewall 28 therewith, central cone 24 extending above the curved sidewall 28, and a circular depression forming a trough 26 extending around the cone 24 and curved sidewalls 28. The preferred embodiment is approximately seven inches in diameter and having a thickness of about 2½ inches from the bottom surface to the top. The flat central portion is about two inches in diameter.

The top and side portions of the base not contacting the ground or other support surface could be shaped in any convenient design or camouflaged in some manner such as with paint of synthetic or even real grass. Moreover, grass, straw, or other substance desirable to a turkey could be spread on the surface of the base, contained within a depression, or contained within a lip formed around the top surface of the base to yield a more natural and attractive base to blend in with the surroundings. Although a preferred embodiment has a solid top, the decoy could be suspended upon a stake or cone extending upward from the bottom of the base bowl or base saucer with weights affixed with a means for holding at selected positions within the bowl, saucer or disc. A stake or rod 14 having a threaded distal end is disposed through an opening 15 in the cone 24 of the base 12 and extends downward to cooperatively engage a threaded socket 20 mounted to the inside of the base 12 around the periphery of the socket 20. The rod is made of metal or plastic and may be fabricated to be retractable consisting of one or more telescoping sections, and preferably four sections about three inches in length. The sections may be interlocked by twisting tightening the sections or interlocked by other means such as conventional aperture and detent means biased by a tension spring or strip of metal or plastic. The preferred embodiment utilizes a bottom section of approximately ¾ inches in diameter, whereby each successive section is progressively smaller in diameter and collapses within the preceding section. The top section is about ⅜ of an inch in diameter and the top ½ inch is tapered at the distal end. The distal end may be drilled and threaded to receive a small bolt for cooperative engagement to hold the decoy into position upon the rod or stake 14. Thus, the hole in the molded turkey decoy's 18 back rests on the tapered portion of the top section of the rod 14. The small bolt is then screwed into the threaded hole on top. The head prevents the decoy 18 from coming of f of the stake. Upon being fully extended the top of the stake 14 is approximately 13 inches high. Upon being retracted the stake 14 is only 3¾ inches high.

The counter balancing weight 19 is attached to the inside bottom center portion of the base 12. It is positioned around the central rod 14 extending through the cone 24 down into the socket 20. It is located so that when the base is tilted from an upright position, the weight will counteract and bring the base back to an upright position. It is anticipated that other types of weights may be utilized and selected positioned to counter balance the decoy base 10. The entire base or compartments formed therein may be filled with a liquid such as water, gravel, lead shot, sand, or other heavy ballast. Rubber, gelatin, grease, wax or other particle retaining means may be used to hold the particle in position and prevent noise from shifting ballast.

In the case of sustained high wind, the decoy base will lean over to the side and stay until the wind dies down. Although not required for reduction of practice of the invention, one preferred embodiment includes at least one and preferably two pins, loops, rods, or other attachment points affixed to or formed within the base. As shown in the figures a pair of pins approximately 6" long and ¼" in diameter are attached to the inside of the base. For hunting in high winds, the pins can be stuck in the ground on opposite sides of the base. They will be attached to the bottom of the stake by means of a section of string (such as yarn), rubber band, elastic band, or other resilient cord having memory. Anchoring of the base in this manner will prevent the decoy from leaning over completely, but will still allow the swiveling and rocking motion of the decoy.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented hereinabove. Rather, what is intended to be covered is within the spirit and scope of the appended claims.

I claim:

1. A turkey decoy with a tiltable counter-balanced support base, comprising:

a circular base having a generally curved bottom surface with a small flat central portion, a top surface connecting to said curved bottom surface, said top surface including a central cone having a hole therein, said central cone extending above said circular base, a rod including a proximate end extending vertically through said central hole cooperatively engaging means for holding disposed within said circular base and a distal end extending from said circular base, and means for weighing disposed therein positioned at selected locations around said rod for counter-balancing said circular base;

a mountable molded turkey body comprising a synthetic material and having an opening in a bottom surface;

said rod extending upward through said opening in said bottom surface of said mountable molded turkey body and said distal end of said rod cooperatively engaging means for pivotally supporting said mountable molded turkey body allowing said mountable molded turkey body to rotate 360 degrees.

2. The turkey decoy with a tiltable counter-balanced support base of claim 1, wherein said means for holding is a threaded socket for threadably engaging a threaded distal end of said rod.

3. The turkey decoy with a tiltabie counter-balanced support base of claim 1, said top surface including a circular depression forming a trough extending around said central cone defining an upper section resembling a torus.

4. The turkey decoy with a tiltable counter-balanced support base of claim 1, wherein said small flat central portion is about two inches in diameter.

5. The turkey decoy with a tiltable counter-balanced support base of claim 1, wherein said means for holding said rod within said central cone is a friction fit.

6. The turkey decoy with a tiltable counter-balanced support base of claim 1, wherein said rod is retractable and comprises at least two telescoping sections.

7. The turkey decoy with a tiltable counter-balanced support base of claim 1, said top surface including a circular depression forming a trough extending around said central cone defining an upper section resembling a torus.

8. A turkey decoy with a tiltable counter-balanced support base, comprising a base having a generally curved bottom surface with a small flat central portion, a top surface connecting to said curved bottom surface forming a sidewall therewith, a central cone extending above said sidewall, said central cone including a rod having a proximal end affixed thereto and having a distal end extending vertically therefrom, means for cooperatively engaging said rod, and weight means for counter-balancing said base;

a mountable molded turkey body comprising a synthetic material and having an opening in a bottom surface; and said rod extending upward through said opening in said bottom surface of said mountable molded turkey body and said distal end of said rod cooperatively engaging means for pivotally supporting said mountable molded turkey body allowing said mountable molded turkey body to rotate 360 degrees.

9. The turkey decoy with a tiltable counter-balanced support base of claim 8, wherein means for cooperatively engaging said rod is a socket formed within said base in alignment with said central cone said socket including means for holding said rod.

10. The turkey decoy with a tiltable counter-balanced support base of claim 9, wherein said means for holding said rod within said socket is by a friction fit.

11. The turkey decoy with a tiltable counter-balanced support base of claim 9, wherein said socket is threaded for threadably engaging threads formed on a distal end of said rod.

12. The turkey decoy with a tiltable counter-balanced support base of claim 8, wherein said rod is retractable and comprises at least two telescoping sections.

13. The turkey decoy with a tiltable counter-balanced support base of claim 8, wherein said weight means for counter-balancing said base comprises water, gravel, lead shot, sand and combinations thereof.

14. The turkey decoy with a tiltable counter-balanced support base of claim 13, including means for holding said weight means at selected positions within said base.

15. The turkey decoy with a tiltable counter-balanced support base of claim 14, wherein said means for holding said weight means at selected positions within said base comprises rubber, gelatin, grease, and combinations thereof.

* * * * *